United States Patent
Spitzer

(10) Patent No.: US 12,097,979 B1
(45) Date of Patent: Sep. 24, 2024

(54) SATELLITE FOR RENDEZVOUS AND DOCKING USING ELECTRIC PROPULSION THRUSTERS

(71) Applicant: Astroscale Israel Ltd., Tel Aviv (IL)

(72) Inventor: Arnon Spitzer, Lapid (IL)

(73) Assignee: Astroscale Israel, Ltd., Tel Aviv (IL)

( * ) Notice: Subject to any disclaimer, the term of this patent is extended or adjusted under 35 U.S.C. 154(b) by 0 days.

(21) Appl. No.: 18/205,526

(22) Filed: Jun. 3, 2023

Related U.S. Application Data

(60) Provisional application No. 63/449,307, filed on Mar. 1, 2023.

(51) Int. Cl.
  *B64G 1/64* (2006.01)
  *B64G 1/24* (2006.01)
  *B64G 1/40* (2006.01)

(52) U.S. Cl.
  CPC ............ *B64G 1/646* (2013.01); *B64G 1/244* (2019.05); *B64G 1/40* (2013.01)

(58) Field of Classification Search
  None
  See application file for complete search history.

(56) References Cited

U.S. PATENT DOCUMENTS

| | | | |
|---|---|---|---|
| 7,575,199 B2 | 8/2009 | D'Ausilio | |
| 7,624,950 B2 | 12/2009 | D'Ausilio | |
| 9,944,412 B2 | 4/2018 | Szabo | |
| 10,384,811 B2 | 8/2019 | Knirsch | |
| 10,464,694 B1 * | 11/2019 | Schwarz | B64G 1/2427 |
| 10,513,352 B2 | 12/2019 | Poncet | |
| 10,611,504 B2 | 4/2020 | Halsband | |
| 10,625,882 B2 | 4/2020 | Reitman | |
| 10,737,807 B2 | 8/2020 | Haertel | |
| 10,850,869 B2 | 12/2020 | Nicholson | |
| 11,117,683 B2 | 9/2021 | Reitman | |
| 11,286,061 B2 | 3/2022 | Reitman | |
| 11,292,618 B2 | 4/2022 | Weiss | |
| 11,492,148 B2 | 11/2022 | Nicholson | |
| 11,643,227 B2 | 5/2023 | Halsband | |

(Continued)

FOREIGN PATENT DOCUMENTS

CN 114715438 5/2022

OTHER PUBLICATIONS

Bender et al. "Guidance, Flight Mechanics and Trajectory Optimization." vol. XII—Relative Motion, Guidance Equations for Terminal Rendezvous, Apr. 1968. (Year: 1968).*

(Continued)

*Primary Examiner* — Joshua J Michener
*Assistant Examiner* — Ka Chun Leung
(74) *Attorney, Agent, or Firm* — Critical Path IP Law, LLC

(57) ABSTRACT

Satellite systems and methods to perform rendezvous and docking between a servicer satellite and an on-orbit satellite, and specifically to satellite systems and methods to perform rendezvous and docking between a servicer satellite and an on-orbit client satellite using electric propulsion thrusters. In one aspect, a servicer satellite with a set of thruster arms each attached to an electric propulsion thruster performs acceleration, deceleration, and steering maneuvers through six degree of freedom positioning of the thrusters, the same set of thruster arms and thrusters performing station keeping of the docked servicer-client satellite system.

23 Claims, 10 Drawing Sheets

(56) References Cited

U.S. PATENT DOCUMENTS

| | | |
|---|---|---|
| 2018/0029727 A1* | 2/2018 | Doubrere ................. B64G 1/40 |
| 2018/0251240 A1 | 9/2018 | Reitman |
| 2019/0210744 A1 | 7/2019 | Kawamura |
| 2021/0078732 A1* | 3/2021 | Reitman .............. B64G 1/1078 |
| 2021/0253277 A1 | 8/2021 | Nicholson |

OTHER PUBLICATIONS

Okasha et al. "Guidance, Navigation and Control for Satellite Proximity Operations using Tschauner-Hempel Equations." J. of Astronaut Science, Dec. 2014. (Year: 2014).*

Gong et al. "Study on Forced Straight-Line Guidance for the Final Translation Phase of Spacecraft Rendezvous." CMES-Computer Modeling in Engineering & Sciences, Jan. 2020. (Year: 2020).*

"Orbital Maneuver." Wikipedia, Wikimedia Foundation, Inc, archived by The Wayback on Feb. 2, 2021 at web.archive.org/web/20210209145406/https://en.wikipedia.org/wiki/ Orbital_maneuver (Year: 2021).*

International Searching Authority, International Search Report and Written Opinion mailed May 16, 2024, in PCT/IB2024/051831.

* cited by examiner

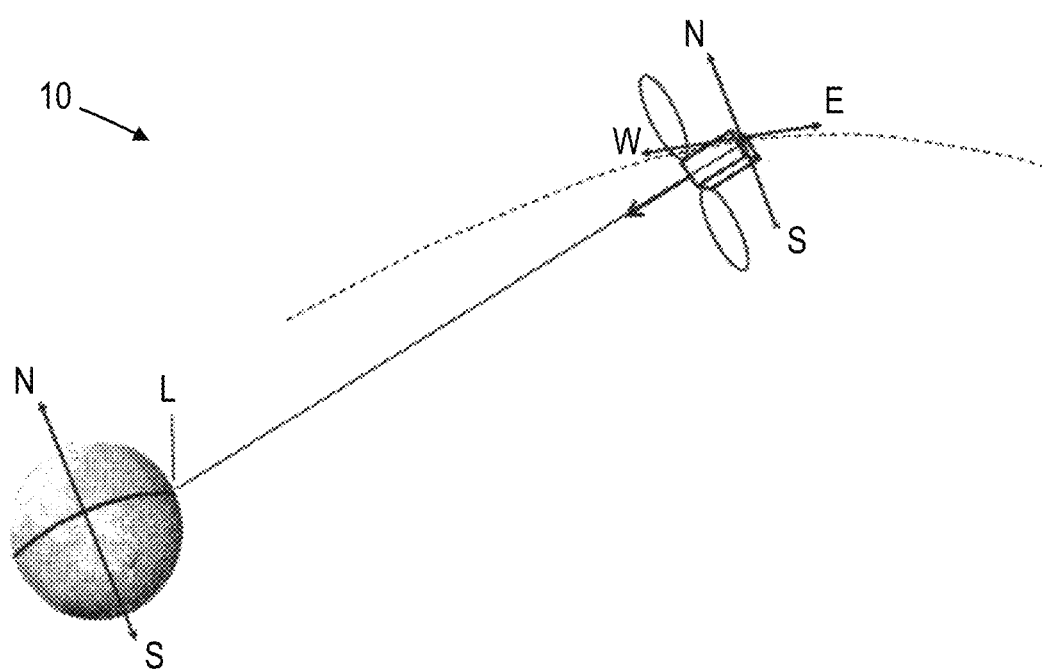
FIG.1A: *Prior Art*

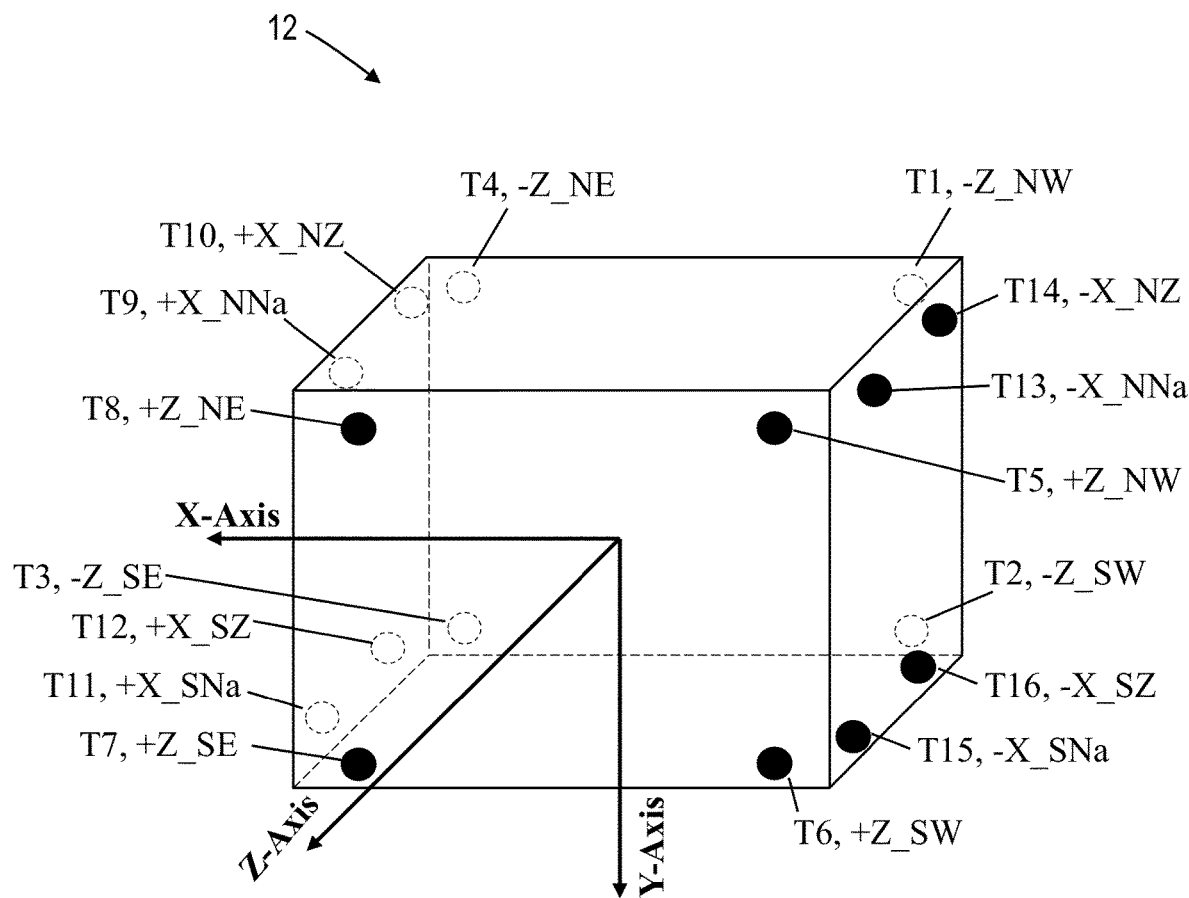
FIG.1B: *Prior Art*

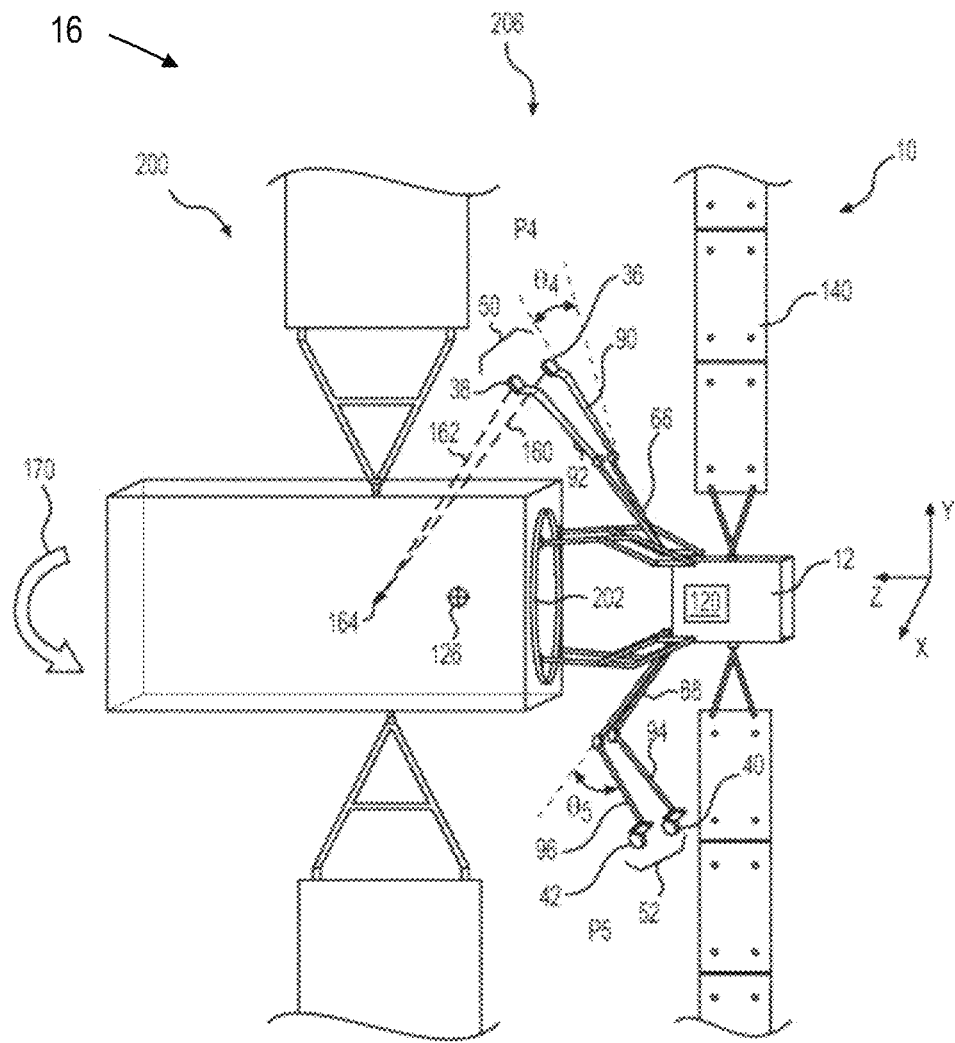
FIG.1C: *Prior Art*

SATELLITE FOR RENDEZVOUS AND DOCKING USING ELECTRIC PROPULSION THRUSTERS

CROSS-REFERENCE TO RELATED APPLICATION

This application is a nonprovisional patent application of and claims the benefit of U.S. Provisional Patent Application No. 63/449,307 titled "SATELLITE FOR RENDEZVOUS AND DOCKING USING ELECTRIC PROPULSION THRUSTERS" filed 1 Mar. 2023, the disclosure of which is hereby incorporated herein by reference in entirety.

FIELD

The disclosure relates generally to satellite systems and methods to perform rendezvous and docking between a servicer satellite and an on-orbit client satellite, and specifically to satellite systems and methods to perform rendezvous and docking between a servicer satellite and an on-orbit client satellite using electric propulsion thrusters.

BACKGROUND

Conventional servicer satellites use chemical thrusters for rendezvous and docking which are relatively quite costly, inefficient, heavy and consume large amounts of fuel due to low thruster fuel efficiency. Typically, at least sixteen chemical propulsion thrusters are mounted on the corners of the servicing spacecraft which allow maneuverability only during Rendezvous and Docking ("RvD"). Such chemical thrusters provide thrust along the velocity vector and along the anti-velocity vector (for braking and detaching) as well as outer plane maneuvers such that six Degree of Freedom (6 DOF or 6DOF) is achieved. Some servicer satellites use supplemental electric propulsion thrusters for station keeping after docking by the chemical thrusters. Such a conventional hybrid propulsion system consisting of both chemical propulsion and electric propulsion make the servicing spacecraft unnecessarily overly expensive, heavy and complicated.

The electric propulsion servicer satellite system of the disclosure this problem by using electric propulsion thrusters as the exclusive in-orbit propulsion thrusters, thereby eliminating chemical thrusters. The electric propulsion servicer satellite system provides the same maneuverability as the Chemical Propulsion system used solely for RvD, thereby providing a relatively less expensive, more efficient, lighter, and more environmentally friendly system. Among the services to be provided include, but are not limited to, life extension (station keeping and attitude control), de-orbiting, orbital repositioning, debris mitigation.

SUMMARY

A satellite system and method of use to perform rendezvous and docking between a servicer satellite and an on-orbit satellite is disclosed. The system and method exclusively use electric propulsion thrusters mounted on the servicer satellite to perform rendezvous and docking. The servicer satellite is equipped with a set of thruster arms, each attached to an electric propulsion thruster, to perform acceleration, deceleration, and steering maneuvers through six degree of freedom positioning of the thrusters. The same set of thruster arms and thrusters may also perform station keeping of the docked servicer-client satellite system.

Generally, the electric propulsion servicer satellite system, in one embodiment, includes one or more of the following features:
1. a reduced set of four (4) thruster arms with attached single electric thrusters to provide complete directional control, rather than conventional systems requiring sixteen (16) chemical thrusters
2. hinge rotating thruster arms each having a fixedly mounted single thruster at the thruster arm edge that may produce acceleration and deceleration forces
3. a set of two pairs of rotatable thruster arms, a first pair operating to provide forces in the +Z direction and outer plane direction and a second pair operating to provide forces in the −Z direction and outer plane direction; stated another way, the +Z orientation may have outer plane components (each TA with its own Cant and Slew or throttling) to steer the spacecraft toward the host and at the same time control the angular momentum
4. thrusters that may be throttled and that are gimbaled such that the thrust vector may be adjusted or directed during thruster firing
5. thrusters may be used for momentum management of the servicer and/or the docked servicer-client satellite system By way of providing additional background, context, and to further satisfy the written description requirements of 35 U.S.C. § 112, the following references are incorporated by reference in their entireties: U.S. Pat. No. 10,384,811 to Knirsch; U.S. Pat. No. 10,737,807 to Haertel; U.S. Pat. No. 11,492,148 to Nicholson; U.S. Pat. No. 10,513,352 to Poncet; U.S. Pat. No. 7,575,199 to D'Ausilio; U.S. Pat. No. 11,292,618 to Weiss; U.S. Pat. No. 9,944,412 to Szabo; U.S. Pat. No. 10,611,504 to Halsband; and U.S. Pat. No. 11,286,061 to Reitman.

The phrases six degrees of freedom ("DOF"), 6 degrees of freedom, 6DOF, 6-DOF, and 6 DOF refer to the six mechanical degrees of freedom of movement of a rigid body in three-dimensional space. Specifically, the body is free to change position as forward/backward, up/down, left/right translation in three perpendicular axes (e.g., in XYZ axes), combined with changes in orientation through rotation about three perpendicular axes, often termed yaw (normal axis), pitch (transverse axis), and roll (longitudinal axis).

In one embodiment, a method of performing rendezvous, docking, and station keeping between a servicer satellite and a client satellite is disclosed, the method comprising: providing a servicer satellite comprising: a body comprising an X axis with a +X direction and a −X direction, a Y axis with a +Y direction and a −Y direction, and a Z axis with a +Z direction and a −Z direction; a gripping mechanism attached to the body and adapted to attach to the client satellite; a set of extension arms coupled to a respective set of thrusters, the set of extension arms comprising: i) a first extension arm attached to the body at a first extension arm first location and coupled to a first thruster at a first extension arm second location, ii) a second extension arm attached to the body at a second extension arm first location and coupled to a second thruster at a second extension arm second location, iii) a third extension arm attached to the body at a third extension arm first location and coupled to a third thruster at a third extension arm second location, and iv) a fourth extension arm attached to the body at a first extension arm fourth location and coupled to a fourth thruster at a second extension arm fourth location, each of the set of extension arms configured to provide 6 DOF positioning of the respective set of thrusters; and a controller configured to fire each of the set of thrusters; deploying the set of extension arms; firing each of the third thruster and the fourth thruster along the +Z direction to form a first rendezvous thrust vector operating to accelerate the servicer satellite and to decrease a separation distance between the servicer satellite and the client satellite (and, in one aspect, additionally or alternatively reduce the angular momentum of the service satellite to about zero firing the first thruster and the second thruster along the +X, −X, +Y, −Y and −Z directions to form a second rendezvous thrust vector operating to decelerate the servicer satellite and to substantially reduce an angular momentum or a rotational velocity of the servicer satellite to about zero; docking the servicer satellite with the client satellite using the gripping mechanism to form an interconnected unit; and maintaining the interconnected unit at a substantially stationary orbit by operation of the first thruster and the second thruster.

In one aspect, the servicer satellite further comprises a set of momentum wheels operating to perform attitude control of the servicer satellite. In another aspect, a first thrust vector of the first thruster and a second thrust vector of the second thruster pass through the center of mass of the servicer satellite. In another aspect, the first extension arm first location is diagonally separated from the second extension arm first location, and the third extension arm first location is diagonally separated from the fourth extension arm first location. In another aspect, each of the first thruster, second thruster, third thruster, and fourth thruster are electric propulsion thrusters.

In another embodiment, a servicer satellite to perform rendezvous, docking, and station keeping with a client satellite is disclosed, the servicer satellite comprising: a body comprising an X axis with a +X direction and a −X direction, a Y axis with a +Y direction and a −Y direction, and a Z axis with a +Z direction and a −Z direction; a gripping mechanism attached to the body and adapted to attach to a client satellite to form an interconnected unit comprising the client satellite and the servicer satellite; a set of extension arms comprising: i) a first extension arm attached to the body at a first extension arm first location and coupled to a first thruster at a first extension arm second location, and ii) a second extension arm attached to the body at a second extension arm first location and coupled to a second thruster at a second extension arm second location, each of the first extension arm and the second extension arm configured to provide respective 6 DOF positioning of the first thruster and the second thruster; a controller configured to fire: i) the first thruster to produce a first thruster thrust vector comprising first thruster thrust vector components along at least one of the +X and −X directions, at least one of the +Y and −Y directions, and at least one of the +Z and −Z directions, and ii) the second thruster to produce a second thruster thrust vector comprising second thruster thrust vector components along at least one of the +X and −X directions, at least one of the +Y and −Y directions, and at least one of the +Z and −Z directions; wherein: rendezvous and docking of the servicer satellite with the client satellite is performed by firing of the first thruster and the second thruster; and the interconnected unit is maintained at a substantially stationary orbit by operation of the first thruster and the second thruster.

In one aspect, the first extension arm further comprises a medial rotatable hinge, is rotatably attached to the body at the first extension arm first location, and is fixedly attached to the first thruster at the first extension arm second location; and the second extension arm further comprises a medial rotatable hinge, is rotatably attached to the body at the second extension arm first location, and is fixedly attached to the second thruster at the second extension arm second location. In another aspect, the first extension arm first location is diagonally separated from the second extension arm first location. In another aspect, a firing of the first thruster and a firing of the second thruster substantially reduce an angular momentum or a rotational velocity of the servicer satellite to about zero. In another aspect, the servicer satellite further comprises: a third extension arm attached to the body at a third extension arm first location and coupled to a third thruster at a third extension arm second location, and ii) a fourth extension arm attached to the body at a fourth extension arm fourth location and coupled to a fourth thruster at a fourth extension arm fourth location, each of the third extension arm and the fourth extension arm configured to provide respective 6 DOF positioning of the third thruster and the fourth thruster. In another aspect, the controller is further configured to fire: i) the third thruster to produce a third thruster thrust vector comprising third thruster thrust vector components along the +Z direction, and ii) the fourth thruster to produce a fourth thruster thrust vector comprising fourth thruster thrust vector components along the +Z direction. (Note that in one aspect, the two diagonal thrusters may additionally or alternatively produce one or more out plane components to allow maneuverability as well as angular momentum management). In another aspect, the third extension arm first location is diagonally separated from the fourth extension arm first location. In another aspect, the first thruster thrust vector passes through a servicer satellite center of mass and the second thruster thrust vector passes through the servicer satellite center of mass. In another aspect, the servicer satellite further comprises a set of momentum wheels operating to perform attitude control of the servicer satellite. In another aspect, each of the first thruster, second thruster, third thruster, and fourth thruster are electric propulsion thrusters.

In still another embodiment, a servicer satellite to perform rendezvous, docking, and station keeping with a client satellite is disclosed, the servicer satellite comprising: a body comprising an X axis with a +X direction and a −X direction, a Y axis with a +Y direction and a −Y direction, and a Z axis with a +Z direction and a −Z direction; a gripping mechanism attached to the body and adapted to attach to a client satellite to form an interconnected unit comprising the client satellite and the servicer satellite; at least one extension arm attached to the body at a first location and coupled to at least one thruster at a second location, the at least one extension arm configured to provide 6 DOF positioning of the thruster; a controller configured to fire the at least one thruster; wherein: rendezvous and docking of the servicer satellite with the client satellite is performed by firing of the at least one thruster to produce: i) a first thrust vector comprising first thrust vector components along at least the +Z direction, and ii) a second thrust vector comprising second thrust vector components along at least one of the +X and −X directions, at least one of the +Y and −Y directions, and the −Z directions.

In one aspect, the at least one thruster is an electric propulsion thruster. In another aspect, the servicer satellite further comprises a set of momentum wheels operating to perform attitude control of the servicer satellite. In another aspect, the at least one extension arm further comprises a medial rotatable hinge, is rotatably attached to the body at the first location, and is fixedly attached to the first thruster at the second location.

In still another embodiment, a method of performing rendezvous, docking, and station keeping between a servicer satellite and a client satellite is disclosed, the method comprising: providing a servicer satellite comprising: a body comprising an X axis with a +X direction and a −X direction, a Y axis with a +Y direction and a −Y direction, and a Z axis with a +Z direction and a −Z direction; a gripping mechanism attached to the body and adapted to attach to a client satellite to form an interconnected unit comprising the client satellite and the servicer satellite; at least one extension arm attached to the body at a first location and coupled to at least one thruster at a second location, the at least one extension arm configured to provide 6 DOF positioning of the thruster; a controller configured to fire the at least one thruster; deploying the at least one extension arm; firing the at least one thruster along the +Z direction to form a first rendezvous thrust vector operating to accelerate the servicer satellite and to decrease a separation distance between the servicer satellite and the client satellite; firing the at least one thruster along the +X, −X, +Y, −Y and −Z directions to form a second rendezvous thrust vector operating to decelerate the servicer satellite and to substantially reduce an angular momentum or a rotational velocity of the servicer satellite to about zero; docking the servicer satellite with the client satellite using the gripping mechanism to form an interconnected unit; and maintaining the interconnected unit at a substantially stationary orbit by operation of the at least one thruster.

In one aspect, the at least one thruster is an electric propulsion thruster. In another aspect, the servicer satellite further comprises a set of momentum wheels operating to perform attitude control of the servicer satellite. In another aspect, the at least one extension arm further comprises a medial rotatable hinge, is rotatably attached to the body at the first location and is fixedly attached to the first thruster at the second location.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

Various embodiments or portions of methods of manufacture may also or alternatively be implemented partially in software and/or firmware, e.g., analysis of signs. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

The disclosure will be readily understood by the following detailed description in conjunction with the accompanying drawings, wherein like reference numerals designate like elements. The elements of the drawings are not necessarily to scale relative to each other. Identical reference numerals have been used, where possible, to designate identical features that are common to the figures.

FIG. 1A is a prior art depiction of notations associated with satellite location and directions;

FIG. 1B is a prior art depiction of notations and locations of conventional thrusters used for rendezvous and docking as mounted on a satellite body;

FIG. 1C is a prior art illustration of an existing servicer satellite designed to, among other things, provide station-keeping of an interconnected servicer-client satellite system, the servicer having a set of four thrusters mounted to two yoke arms;

DETAILED DESCRIPTION

Figure 2:
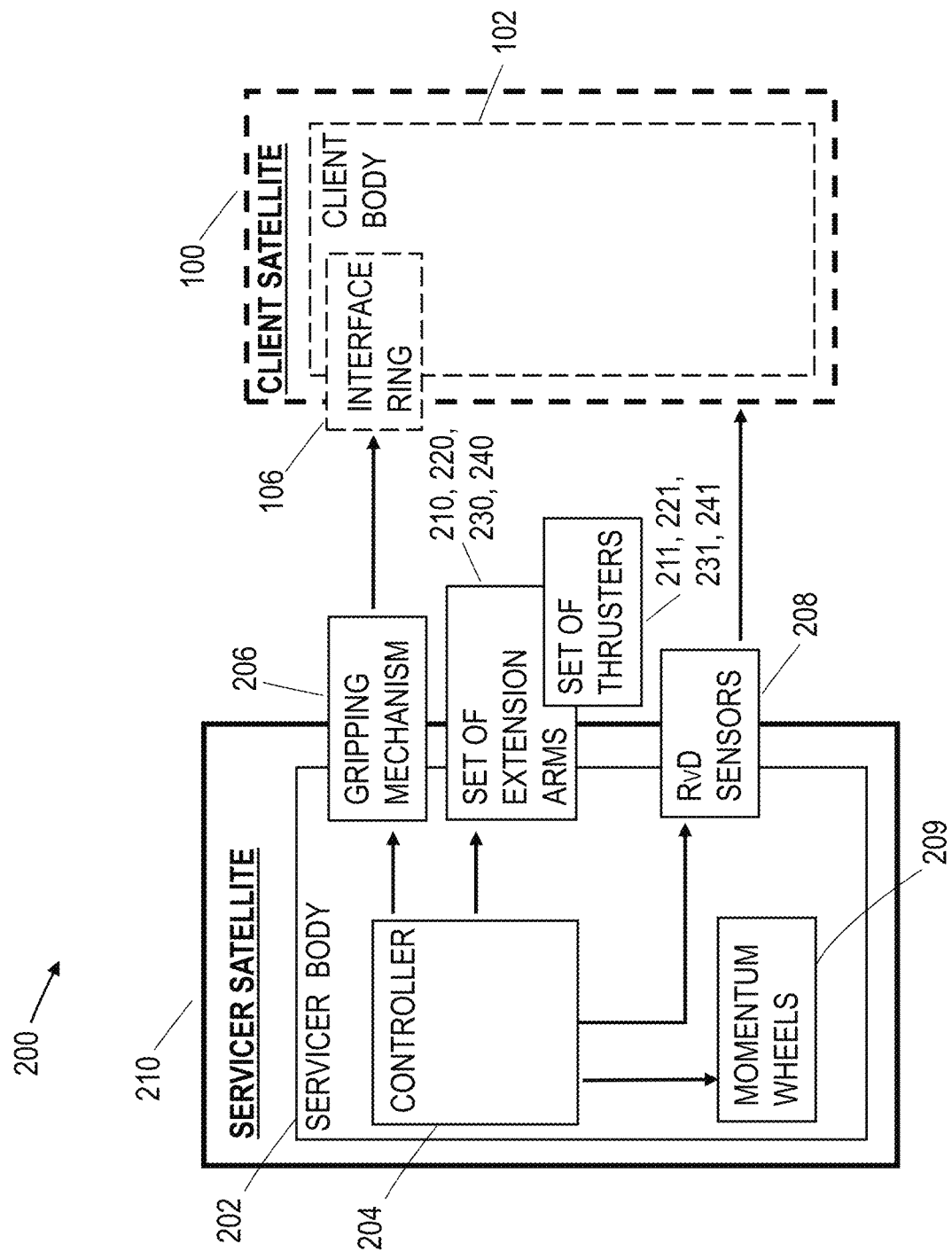
FIG. 2 is a block diagram depiction of one embodiment of the electric propulsion servicer satellite system.

Reference will now be made in detail to representative embodiments. The following descriptions are not intended to limit the embodiments to one preferred embodiment. To the contrary, it is intended to cover alternatives, modifications, and equivalents as can be included within the spirit and scope of the described embodiments as defined, for example, by the appended claims.

The disclosed devices, systems, and methods of use will be described with reference to FIGS. 1A-5. Generally, satellite systems and methods to perform rendezvous and docking between a satellite and an on-orbit spacecraft are described. The electric propulsion servicer satellite system may be referred to as "servicer satellite system," "servicer satellite," "servicer system", or simply "system." The servicer satellite system may also be referred as "LEXI." The method of use of the electric propulsion servicer satellite system may be referred to as "servicer satellite system method," "servicer satellite method," "servicer system method", "servicer method," or simply "method."

The present disclosure relates to a method for the LEXI to perform rendezvous and docking to a client or "Host" satellite using only Electric Propulsion. The traditional or conventional Rendezvous and Docking (RvD) of client satellites is through use of chemical thrusters mounted on corners of the servicing (or "servicer") satellite, the set of chemical thrusters providing acceleration in all six directions of the servicer satellite movement, (+Z, −Z, +X, −X, +Y, −Y). In order to achieve such accelerations in all three planes (X,Y,Z), conventional servicer satellites require sixteen to twenty-four chemical thrusters (Four thrusters on the corners of each of the six panels). The chemical thrusters are used only during the RvD phase. In contrast, during In-Orbit servicing of a Host satellite once LEXI has docked, the four electric propulsion thrusters, mounted one each on four thruster arms, are used. (For a description of four thruster arms each with one thruster, see, e.g., U.S. Pat. Nos. 11,286,061; 11,117,683; and 10,625,882, each incorporated by reference in their entireties.)

By including a Chemical Propulsion system for only the RvD, the satellite is more expensive, heavier, requires substantial amount of fuel (since the chemical thrusters are less fuel efficient compared to the electric thrusters), and more complicated to design and integrate, making Chemical Propulsion a relatively very inefficient and cumbersome system.

If by using only an Electric Propulsion System, the RvD phase can be properly executed while achieving the same accuracy and controls like the Chemical Propulsion, substantial benefits can be achieved such as relatively lower satellite cost, lower weight and less complicated system.

FIG. 1A is a prior art depiction 10 of notations associated with satellite location and directions. A geostationary satellite, such as a communication satellite, is depicted orbiting in an orbit trajectory 7000 substantially above location L on the face of the Earth. The plane of orbit 7000 is parallel to the plane of the Earth's equator. Satellite 700 is aimed so that its direction of transmission 710 is aimed substantially towards location L. Direction 710 coincides with the designated longitude, or orbital slot, of satellite 700, also known as the Nadir (Na) direction, and with the longitudinal axis of satellite 700, also known as the Zenith-Nadir (Ze-Na) direction. In an external reference frame, an axis passing through satellite 700 and parallel to the North-South of Earth is marked as the satellite's N-S axis while the axis passing through satellite 700 and perpendicular to arrow 710 and to the satellite's N-S axis is marked as the satellite's E-W axis, where the East direction points to the east of Earth and the west direction points to the west of Earth. Accordingly, the satellite's E-W axis lies substantially in the plane of orbit 7000. Such notations and reference frames will be referenced below with regards to the electric propulsion servicer satellite system and method of use.

FIG. 1B is a prior art depiction 12 of notations and locations of conventional thrusters used for rendezvous and docking as mounted on a satellite body. A notional satellite body is shown as a rectangular block of six (6) sides or panels. A set of thrusters are shown as mounted on four (4) sides or panels of the satellite body (e.g., SE if on the southeast panel or NW if on the northwest panel) and direction of thruster firing indicated as +Z or −Z. The notations X, Y, Z identify on which panel a thruster is located. The notations N, S, E, W identify whether a thruster is on a respective North, South, East, or West part of a panel. And the notations Na, Z identify whether a thruster is on a nadir or zenith part of a panel. The thruster arrangement of FIG. 1B, in which the thrusters are mounted or attached directly on the satellite body (and specifically, not on extension arms) is the traditional or conventional mounting scheme of thrusters for rendezvous and docking, typically using chemical thrusters.

FIG. 1C is a prior art illustration of an existing servicer satellite 16 designed to, among other things, provide station-keeping of an interconnected servicer-client satellite system, the servicer having a set of four thrusters 36, 38, 40, 42 mounted to two yoke arms. Note in particular the three (3) axis X-Y-Z reference system to the right of the interconnected servicer-client, such reference system consistent with that of FIGS. 1A-B.

FIG. 2 is a block diagram depiction of one embodiment of the electric propulsion servicer satellite system 200 of the disclosure. The servicer satellite system 200 comprises a servicer satellite 210, the servicer satellite 210 comprising a servicer body 202, a controller 204, a gripping mechanism 206, RvD sensors 208 used to enable rendezvous and docking with a client satellite, momentum wheels 209 used to enable attitude control (i.e., movement with respect to the Center of Mass ("CM") of the servicer satellite 210, and a set of extension arms 210, 220, 230, 240 each attached or coupled or engaged with a respective thruster 211, 221, 231, and 241 of a set of thrusters. (Note that in some embodiments of the electric propulsion servicer satellite system, the "set" of extension arms may comprise a different number of extension arms other than four, e.g., a single extension arm or a pair (i.e., two) of extension arms. Also, in some embodiments of the electric propulsion servicer satellite system, the set of thrusters are other than a set of four thrusters, such as two thrusters, a single thruster configured to fire in more than one direction, etc. Such embodiments are described in more detail below).

The servicer satellite 210 operates to rendezvous and dock with a client satellite 100 comprising a client body 102 and an interface ring 106 mounted on the client body 102. The gripping mechanism 206 attached to the servicer body 202 is adapted to attach to or dock with the client satellite 100 by way of the interface ring 106. In some embodiments, the gripping mechanism 206 is configured to attach to any external component of the client 100, such as a nozzle of the client, flanges of the client body 102 or flat surface of the client body, a docking plate such as a magnetic docking plate, etc. as known to those skilled in the art.

The controller 204 is configured to fire each of the set of thrusters, to operate each of the set of extension arms, to operate the momentum wheels 209, and/or to operate the RvD sensors 208. The controller 204 may comprise a set of controllers, such as one controlling aspects of the electric propulsion RvD, station-keeping, etc. operations of the system and another handling traditional system aspects such as momentum management. The set of thrusters are configured to perform any of several functions, to include rendezvous, docking, close proximity operations (to a client satellite, e.g.), tandem station keeping (e.g., of the interconnected servicer-client unit), and debris removal.

The servicer satellite 210 aka LEXI comprises of a number or set of deployable and mechanical thruster arms (also referred to as "extension arms"). Further, the LEXI comprises a set of small thrusters, each attached at the edge of the deployable and mechanical thruster arm (See FIG. 3A). As an example, four thrusters may be mounted in a generally symmetrical rectangular configuration. The four thrusters include a northeast thruster, N1, connected to a deployable and mechanical thruster arm via a first thruster positioning device, a northwest thruster, N2, connected to a deployable and mechanical thruster arm via a second thruster positioning device, a southeast thruster, S1, connected to a deployable and mechanical thruster arm via a third thruster positioning device, and a southwest thruster, S2, connected to a deployable and mechanical thruster arm via a fourth thruster positioning device (FIGS. 3A, 3B, 3D, and 3E). These thrusters may be of any type available in the commercial market and/or know to those skilled in the art, such as chemical or electric propulsion thrusters among others bi-propellant thrusters, Hall Effect Thruster, Gridded Ion Thrusters, Arc Jets, Resisto Jets Thrusters, Plasma Propulsion Engines. Each deployable and mechanical thruster arm has a positioning device that incorporates two hinges rotatable about a single axis with two angles $\theta_1$, $\theta_2$. (See FIG. 3B and associated H and F Hinges). Other configurations of hinges and/or rotational components are possible that result in the kinematic ability to position a thruster mounted or disposed on a distal end or distal portion of the thruster arm to provide 6 DOF positioning of the thruster. For example, ball and socket joints may be used, 4-bar linkages, etc, as known to those skilled in the art.

The LEXI has a Thruster Arm ("TA") design that has two rotatable arms (F and H Hinges). The rotation of these arms allows each of the 4 Thrusters to generate forces around all axes. Also, the Thrust Vector may pass through the center of mass (C.O.M. or COM) of the LEXI such that induced torques are not generated.

The Thruster Arms may be gimballed in various positions that enable generation of forces that act on the central satellite body in all planes, thus providing enhanced maneuverability and controllability. There are at least two methods to differentiate the resultant forces in each plane. One method is alignment of each of the Thruster Arms in a different Cant and Slew angle (see FIG. 3C), thus creating different force components (of respective thrust vectors) that pass through the C.O.M. A second method is positioning the Two Thruster Arms in a diagonal orientation, symmetrical to the C.O.M and using the Electric Propulsion throttling capabilities to throttle each of the Electric Propulsion Thrusters, achieving a differentiation of forces going through the C.O.M without inducing any torques. Note that throttling (which results in selectable thrust vector magnitude) may be performed in any embodiment of the electric propulsion servicer satellite system, to include the embodiment of the electric propulsion servicer satellite system in which the servicer comprises two Thruster Arms positioned in a diagonal orientation.

More broadly, the selection and control of thrust vectors of the one or more thrusters of the servicer satellite of the electric propulsion servicer satellite system enable movement of the servicer satellite along any or all of the X, Y, Z axes. Stated another way, the selection and control of thrust vectors of the one or more thrusters of the servicer satellite of the electric propulsion servicer satellite system enable control of the servicer in any of the ±X, ±Y, and ±Z directions and rotation (or non-rotation) about the 3 axes of the servicer (See FIG. 3A).

For executing the RvD phase of operation, the four Thruster Arms (See FIG. 3A) are positioned in two fundamental orientations while providing the necessary maneuverability and controllability.

Two diagonal thrusters (for example N1 and S2) are aligned parallel to the positive Z axis of the satellite (See FIG. 3D), allowing the satellite to accelerate in the positive Z direction (i.e., the +Z direction) and to follow a trajectory to match the orbital parameters of the two satellites and to reduce the range between the LEXI and the Host satellite. Each of these N1 and/or S2 thruster arms may change their steering angle such that an X and/or a Y component may also be generated. Any undesirable induced torques that are produced as a result may be absorbed in the reaction wheels. The other two diagonal Thruster Arms (for example N2 and S1) are rotated in the opposite direction in such a way that the thrust vector of both thrusters passes through the C.O.M. of the LEXI while generating forces in five (5) directions, negative Z (deceleration), Positive and Negative X, and Positive and Negative Y (See FIG. 3E).

By creating a Cant angle (measured from the Y axis) and Slew angle (measured from the Z axis) (see FIG. 3C) for each of the Thruster Arms with respect to the C.O.M., the Thrust Force in the negative Z direction is cumulative. By gimbaling (or otherwise providing an equivalent set of rotation(s)) each of the Thruster Arms, the resultant X and Y components may be either nulled or may produce a net component that is non-zero in either a positive or negative direction for the X component and for the Y component. (The term "NET" or "net" refers to combining one or more vectors, such as thrust vectors, to provide a resultant combined or composite vector; such vector additions are known to those skilled in the art). Another way to produce a non-zero net thrust vector (as mentioned above) is by throttling each of the Thrusters to produce different forces, thereby producing a NET component that is not zero in either a positive or negative direction for the X component and for the Y component.

FIGS. 3A-E depict additional details of the servicer satellite 310 of the servicer satellite system.

Figure 3A:
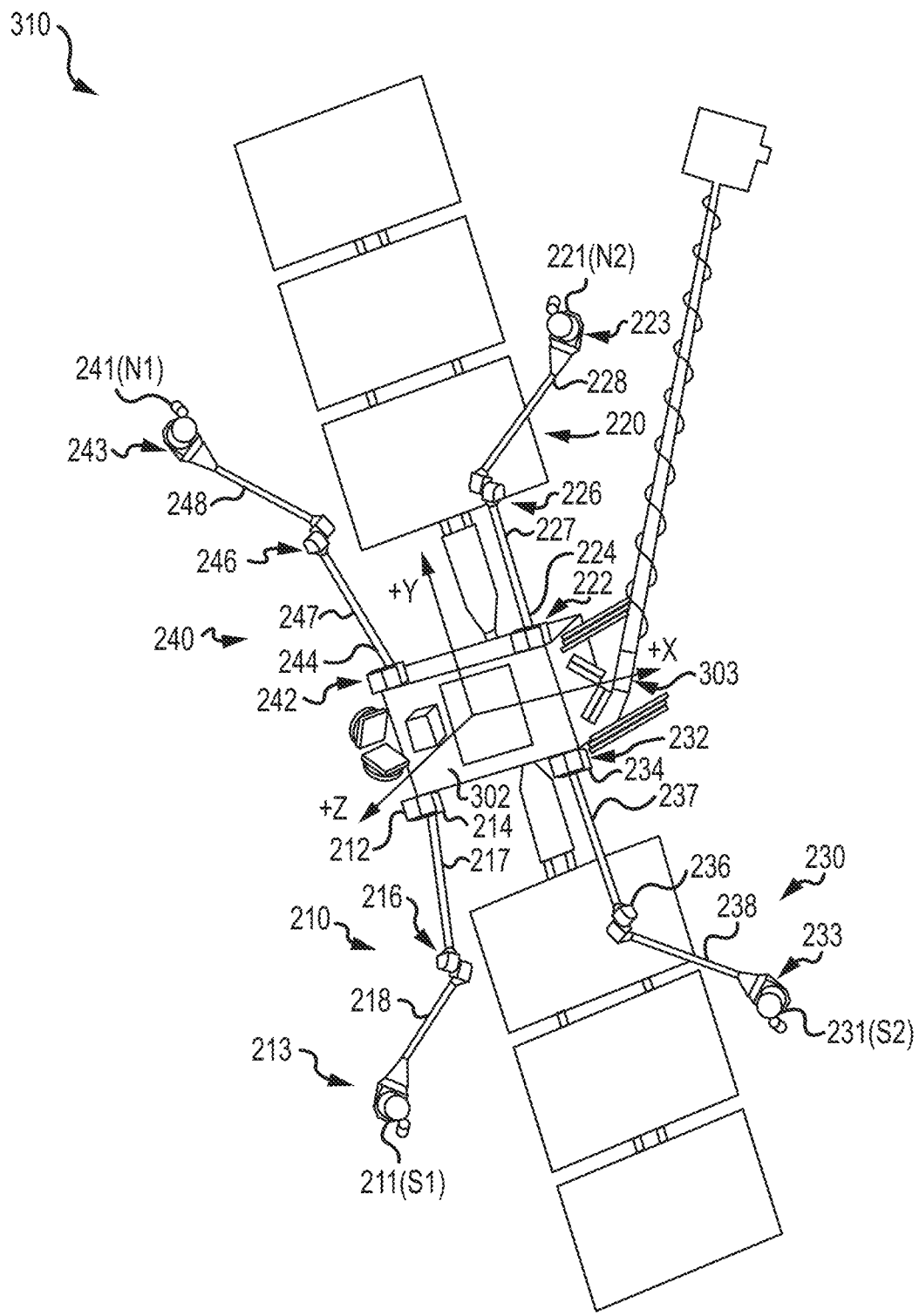
FIG. 3A is a depiction of one embodiment of the electric propulsion servicer satellite of FIG. 2 with a set of four thruster arms in the extended position, each thruster arm attached to a thruster.

With attention to FIG. 3A, the electric propulsion servicer satellite 310 with body 302 is shown with a set of the set of four extension arms 210, 220, 230, 240 in extended positions. The body 302 comprises body axes 303 centered at the center of mass (COM or CM) of the body 302, the body axes 303 comprising an X axis with a +X direction and a −X direction, a Y axis with a +Y direction and a −Y direction, and a Z axis with a +Z direction and a −Z direction.

The electric propulsion servicer satellite 310 comprises a set of four extension arms 210, 220, 230, 240 attached or connected to or coupled with a respective thruster 211, 221, 231, and 241. Generally, each of the four thruster arms comprise two rigid portions, also called a base link and a row, with linkages that provide or enable six (6) degree of freedom (DOF) positioning of a thruster positioned at a distal portion of the extension arms.

A first extension arm 210 is attached to the body 302 at a first extension arm first location 212 and coupled to a first thruster 211 (also called the "S1" thruster, as positioned at a first south panel location) at a first extension arm second location 213. The first extension arm 210 comprises a first extension arm base link 217 connected to body 302 at first extension arm first location 212 with first extension arm first hinge 214 and connected to first extension arm row 218 by way of first extension arm second hinge 216. First thruster 211 is rigidly or fixedly attached to first extension arm 210 at first extension arm second location 213.

A second extension arm 220 attached to the body 302 at a second extension arm first location 222 and coupled to a second thruster 221 (also called the "N2" thruster, as positioned at a second north panel location) at a second extension arm second location 223. The second extension arm 220 comprises a second extension arm base link 227 connected to body 302 at second extension arm first location 222 with second extension arm first hinge 224 and connected to second extension arm row 228 by way of second extension arm second hinge 226. Second thruster 221 is rigidly or fixedly attached to second extension arm 220 at second extension arm second location 223.

A third extension arm 230 attached to the body 302 at a third extension arm first location 232 and coupled to a third thruster 231 (also called the "S2" thruster, as positioned at a second south panel location) at a third extension arm second location 233. The third extension arm 230 comprises a third extension arm base link 237 connected to body 302 at third extension arm first location 232 with third extension arm first hinge 234 and connected to third extension arm row 238 by way of third extension arm second hinge 236. Third thruster 231 is rigidly or fixedly attached to third extension arm 230 at third extension arm second location 233.

A fourth extension arm 240 attached to the body 302 at a fourth extension arm fourth location 242 and coupled to a fourth thruster 241 (also called the "N1" thruster, as positioned at a first north panel location) at a fourth extension arm fourth location 243. The fourth extension arm 240 comprises a fourth extension arm base link 247 connected to body 302 at fourth extension arm first location 242 with fourth extension arm first hinge 244 and connected to fourth extension arm row 248 by way of fourth extension arm second hinge 246. Fourth thruster 241 is rigidly or fixedly attached to fourth extension arm 240 at fourth extension arm second location 243.

Other configurations of extension arms and/or hinges and/or thruster mountings are possible that provide 6 DOF positioning of a thruster positioned at an arm distal end, as known to those skilled in the art. For example, if the thruster were gimbled rather than fixedly attached to the end of the extension arms, one or both of the described hinges could be reduced in respective degree of freedom. In one embodiment, the extension arms with attached thruster are identical to or very similar to those described in the above-cited U.S. Pat. No. 11,286,061 to Reitman entitled "Service Satellite for Providing In-Orbit Services using Variable Thruster Control" and as shown in FIG. 1E.

In some embodiments of the electric propulsion servicer satellite system, the servicer satellite has fewer than four extension arms, such as a single thruster arm or two thruster arms. For example, the servicer satellite may have a single extension arm attached to the body at a first (proximal) location and attached to a single thruster at a second (distal) location, the extension arm configured to provide 6 DOF positioning of the thruster. The thruster may be controlled to fire or produce a thrust vector with thrust vector components along the +Z direction, to produce another thrust vector with thrust vector components along the −Z direction, and yet another with thrust components along one or more of the +X, −X, +Y, and −Y directions. A similar embodiment may comprise a single extension arm yet with two thrusters mounted on the extension arm distal end. Another embodiment may comprise a single extension arm with a single thruster that is able to fire (and thus produce a thrust vector) from multiple sides of the thruster, such as a thruster that can fire in a +Z direction at one instance and, without rotating or moving, fire in the opposite −Z direction.

Figure 3B:
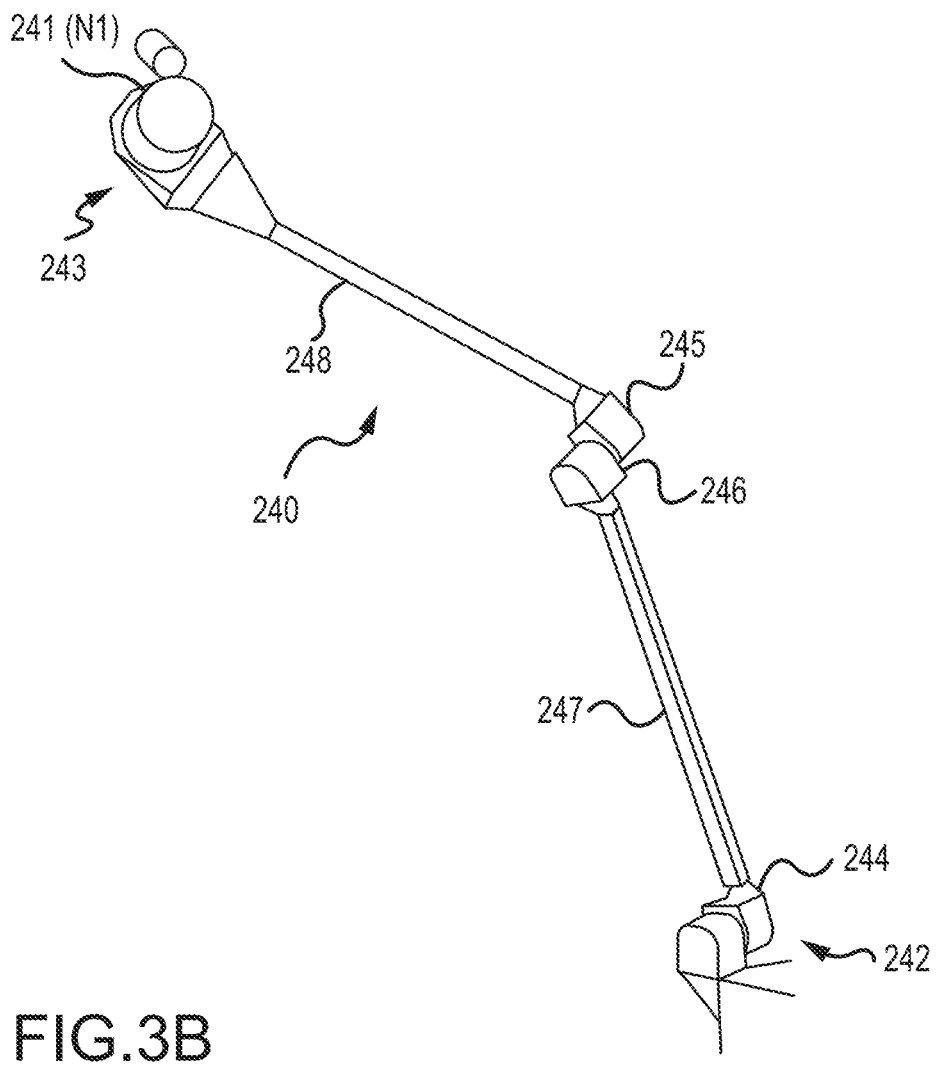
FIG. 3B is a close-up of the one of the thruster arms of the embodiment of FIG. 3A, specifically the thruster arm attached to the N1 thruster.

The features of the extension arms (also called "TA" for thruster arms) with attached thrusters include:

- TA have a wide range of Cant and Slew positions by using two rotating hinges
- Two Diagonal TAs may be devoted to acceleration while the other two TAs are devoted to deceleration
- Outer plane force components (X,Y) may also be part of the Thrust Vector, allowing orbital corrections; either of constant thrust level or throttling may be utilized
- Built-into the system is Momentum Management capabilities (as known to those skilled in the art)
- Using EP for RvD phase allows continuous firing of the EP thrusters as ΔV is small but very accurate and orbital deviations are very small and easily corrected FIG. 3B is a close-up of the fourth thruster arm 240 affixed to fourth thruster 241 (the N1 thruster). As described above, the fourth extension arm 240 comprises a fourth extension arm base link 247 connected to body 302 at fourth extension arm first location 242 with fourth extension arm first hinge 244 and connected to fourth extension arm row 248 by way of fourth extension arm second hinge 246. Fourth thruster 241 is rigidly or fixedly attached to fourth extension arm 240 at fourth extension arm second location 243.

The fourth extension arm first hinge 244 is an "F Hinge" that provides rotation about two axes of the attachment point (the fourth extension arm first location 242) to the body 302. (An "F Hinge" has structure and operates as known to those skilled in the art). In the stowed configuration, H and F angles are zero. When deployed, the F hinge angle is measured with respect to the North or South panel plan. The H angle is measured from the line extending from the base link. H angle of zero has the Row extended to the base link such that the two overlap.

The fourth extension arm second hinge 246 is an "H Hinge" that provides rotation about one axis of the connection between the fourth extension arm row 248 and the fourth extension arm base link 247. (An "H Hinge" has structure and operates as known to those skilled in the art).

The first and second hinges of each of the other three extension arms 210, 220, and 230 have similar sets of hinges to that of the fourth extension arm 240 of FIG. 3B.

In one embodiment, each of the hinges are dual hinge rotatable connections. In one embodiment, one or more of the hinges are gimbled connections. In one embodiment, one or more extension arms are attached to the servicer body by way of a gimbled connection. In one embodiment, one or more extension arms are attached to one or more thrusters by way of a gimbled connection, by way of a hinge, such as an H Hinge or an F Hinge, or a rotatable connection.

Figure 3C:
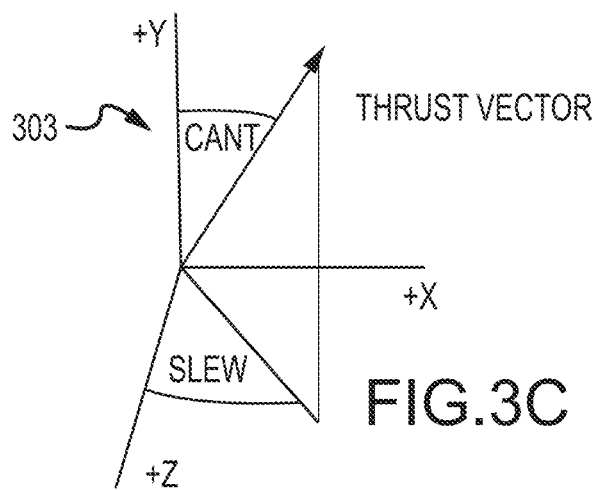
FIG. 3C is a depiction of notations and directions associated with thruster operations.

FIG. 3C is a depiction 303 of notations and directions associated with thruster operations, specifically cant and slew angles.

Figure 3D:
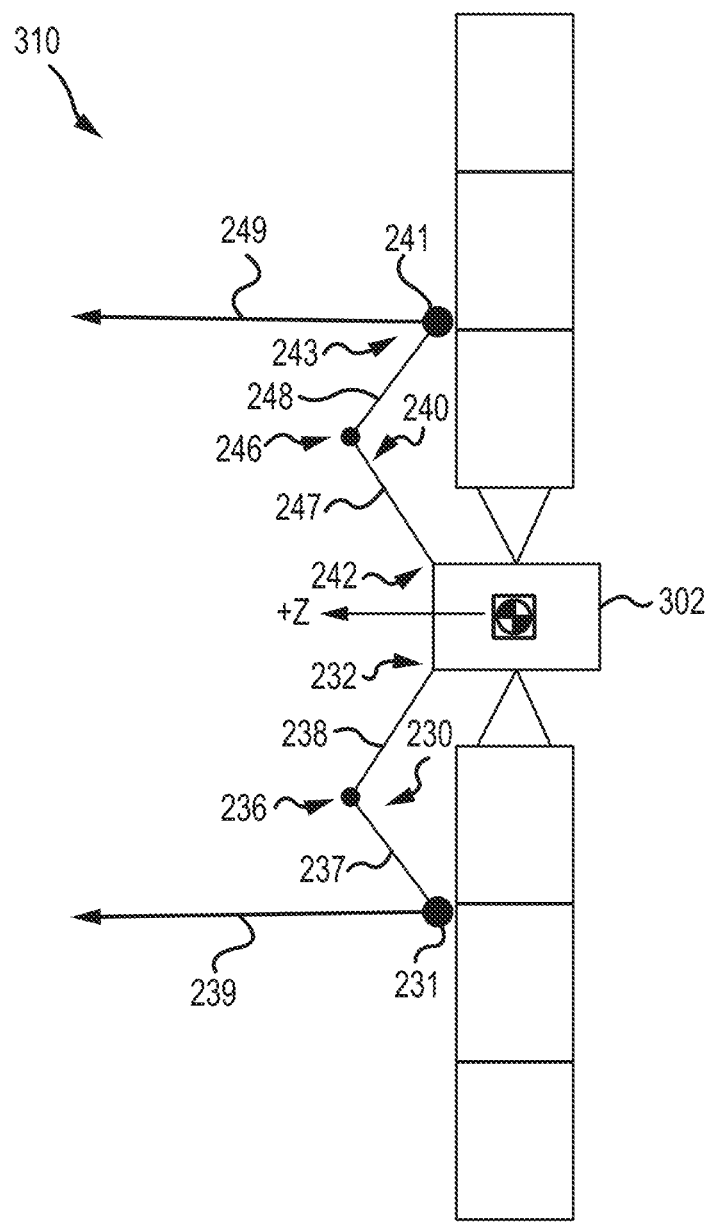
FIG. 3D is a depiction of the embodiment of the electric propulsion servicer satellite of FIG. 3A with attention to two thruster arms attached to respective thrusters N1 and S2, showing thruster firing along the +Z axis.

FIG. 3D is a depiction of the embodiment of the electric propulsion servicer satellite 310 of FIG. 3A with attention to two thruster arms attached to respective thrusters N1 and S2, showing thruster firing along the +Z axis. Fourth extension arm 240 with fourth thruster 241 (the N1 thruster) is shown firing to produce a fourth thrust vector 249 in the +Z direction. Similarly, third extension arm 230 with third thruster 231 (the S2 thruster) is shown firing to produce a third thrust vector 239 in the +Z direction. Note that the third extension arm first location is diagonally separated on a common body panel from the fourth extension arm first location.

The firing of the fourth thruster 241 and the firing of the third thruster 231 are performed in such a way to not induce a torque or rotation of the body about the body COM. Such a configuration is used during rendezvous and docking operations to accelerate the electric propulsion servicer satellite 310 toward a client satellite, as discussed, e.g., in more detail with respect to FIGS. 4A-B. Stated another way, the firing of each of the third thruster and the fourth thruster along the +Z direction forms a (combined or net) first rendezvous thrust vector operating to accelerate the servicer satellite and to decrease a separation distance between the servicer satellite and the client satellite.

Features of the configuration of FIG. 3D include:
Thrust Vector in the +Z direction, closing the range between LEXI and Target client spacecraft as accomplished by two diagonal TAs parallel to the C.O.M.
The two diagonal TAs may have a cant and slew angle such that thrust components in the +X, −X, +Y, −Y directions are also achievable allowing maneuverability of the LEXI while keeping the angular momentum under control
Same TA orientation may be used during Orbit Raising and Station Keeping (Failure Mode)
Burn commands may be generated on the ground and executed on-board based on sensor measurements
Two Thrusters may be fired continuously for long durations
An on board computer may keep spacecraft attitude within requirements using sensors and reaction wheels
Minimal momentum management and minimal to no outer plane corrections are required
Thrust Vectors are parallel to the C.O.M and thus do not generate torques
Momentum management follows the same approach as for the Station Keeping method, e.g., using on-board torque tables maintaining Reaction Wheels within boundaries FIG. 3E is a depiction of the embodiment of the electric propulsion servicer satellite of FIG. 3A with attention to two thruster arms attached to respective thrusters N2 and S1, showing thruster firing through the center of mass of the electric propulsion servicer satellite that produces thrust vector components along the −Z axis.

First extension arm with first thruster 211 (the S1 thruster) is shown firing to produce a first thrust vector 219 with components in the −Z direction, the +X direction and +Y directions. In concert, second extension arm with second thruster 221 (the N2 thruster) is shown firing to produce a second thrust vector 229 with components in the −Z direction, the −X direction, and the −Y direction. Note that the thrust vector of each of the thrusters of FIG. 3E are canted and slewed relative to the Y axis (see FIG. 3C) and produce a vector of three components; the cant and slew angles are directly related to the H and F angles (see FIG. 3C). (Note that coordinate axes 303 are positioned offset from the COM of the body 302 for clarity). Note that the first extension arm first location is diagonally separated on a common body panel from the second extension arm first location.

Figure 3E:
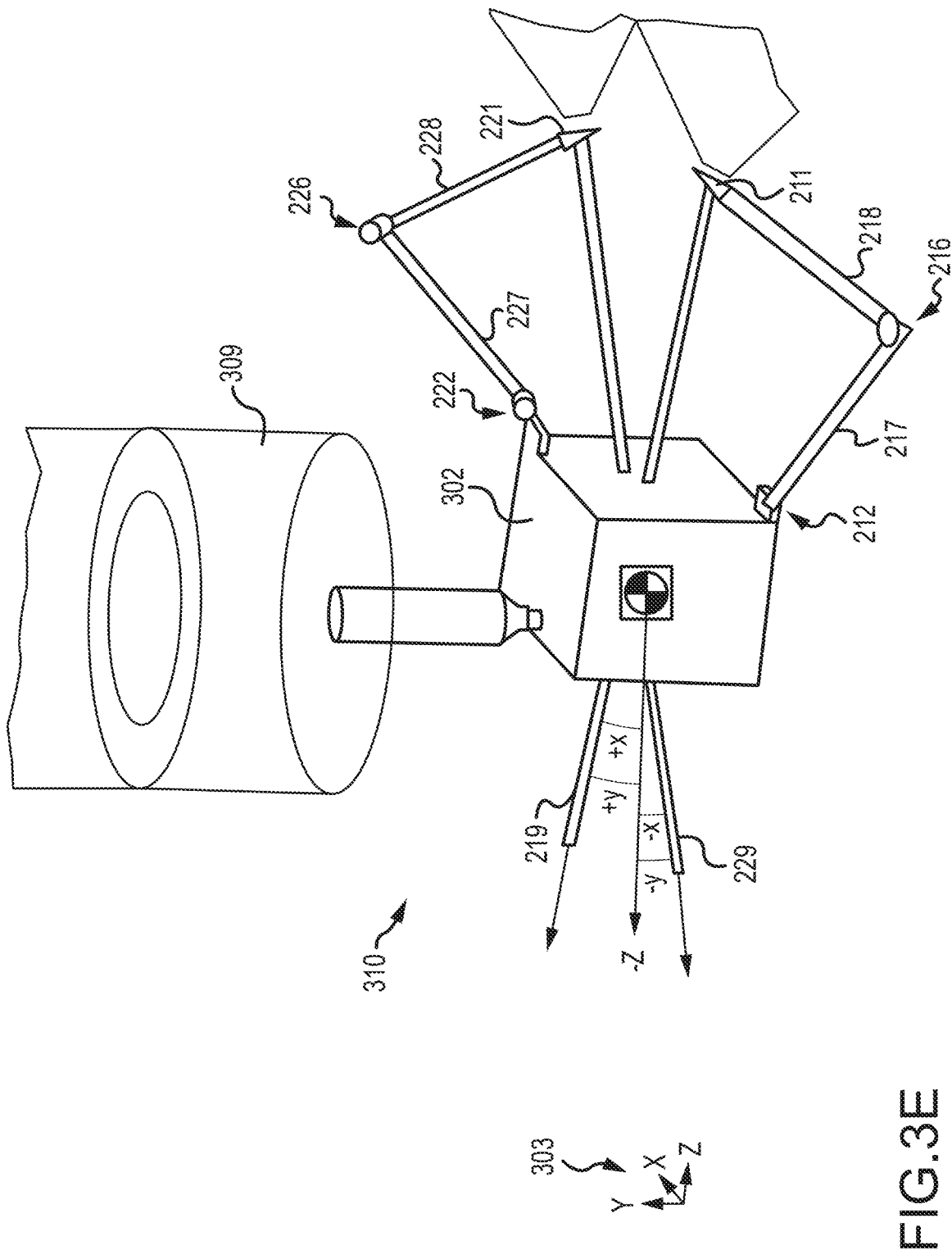
FIG. 3E is a depiction of the embodiment of the electric propulsion servicer satellite of FIG. 3A with attention to two thruster arms attached to respective thrusters N2 and S1, showing thruster firing through the center of mass of the electric propulsion servicer satellite that produces thrust vector components along the −Z axis.

The configuration of FIG. 3E may also produce maneuvering of the body through deliberate off-sets of the two vectors to produce a resulting thrust vector with a non-zero value in one or both of the X and Y axis (such relative orientation and/or maneuvering depicted by the rotational portion 309). Stated another way, the first thruster and the second thruster are fired along the +X, −X, +Y, −Y and −Z directions to form a second (combined or net) rendezvous thrust vector operating to decelerate the servicer satellite and to substantially reduce an angular momentum or a rotational velocity of the servicer satellite to about zero.

Features of the configuration of FIG. 3D include:
Thrust Vector in the −Z direction (deceleration) may be accomplished by having the other Two diagonal TAs pointing through the C.O.M.
A large portion of the net thrust force may be devoted to deceleration in conjunction with full outer plane corrections
Momentum management may follow the same philosophy as the Station Keeping method, using on-board torque tables maintaining Reaction Wheels within boundaries
Station keeping flight software may allow operating one or two TAs while managing Momentum
Thrust Vectors pass through the C.O.M.

Figures 4A, 4B:
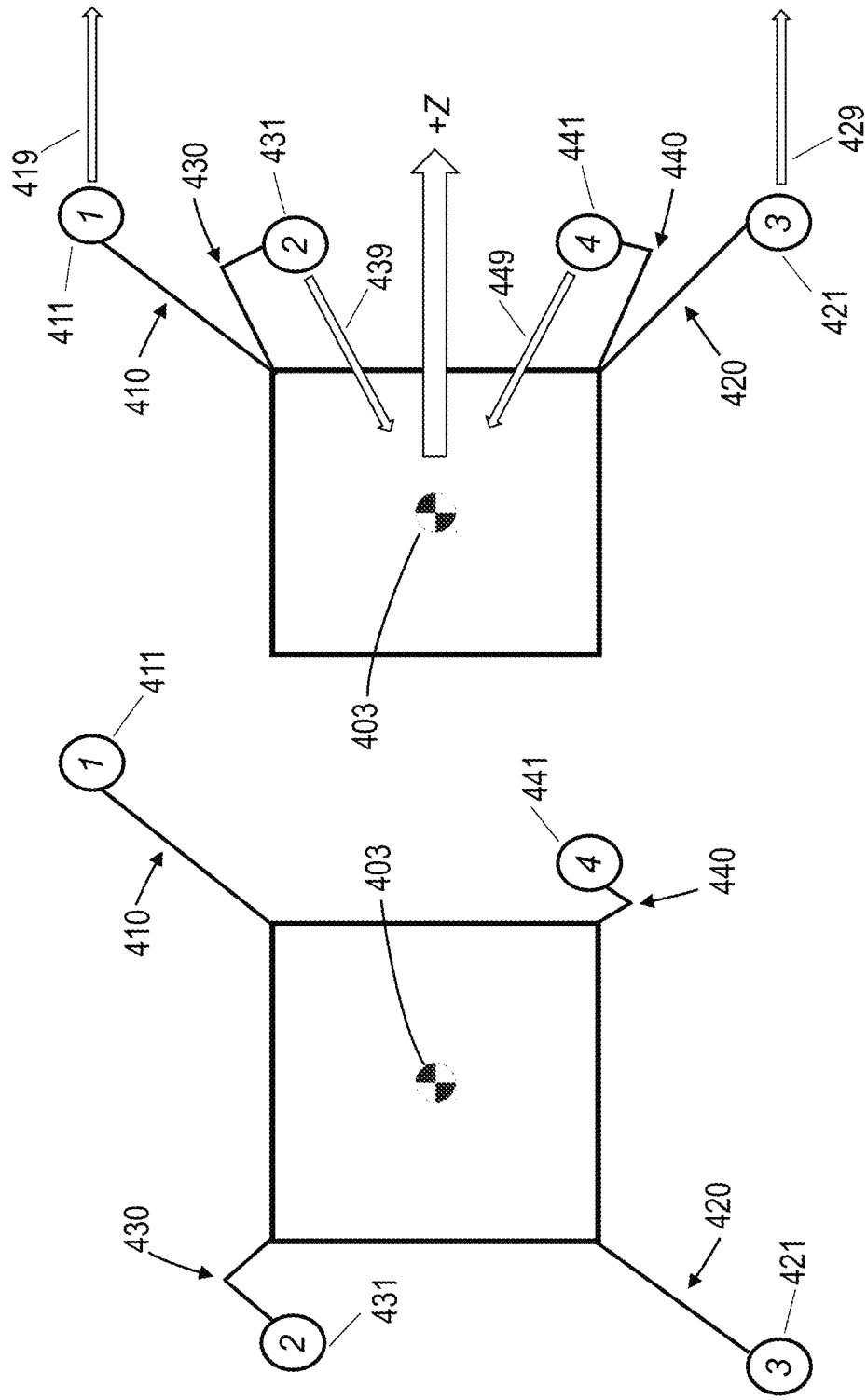
FIG. 4A is a rear view schematical depiction of combined operations of the set of four thrusters of the embodiment of the electric propulsion servicer satellite of FIG. 3A.
FIG. 4B is a side view schematical depiction of the combined operations of the set of four thrusters of the embodiment of the electric propulsion servicer satellite of FIG. 4A.

FIGS. 4A and 4B are respective rear and side views of a schematical depiction of combined operations of the set of four thrusters of the embodiment of the electric propulsion servicer satellite of FIG. 3A. As discussed above, the set of four thrusters may operate in pairs to, among other things, impart motion to the servicer satellite along the +Z or −Z axis.

With attention to FIGS. 4A-B, a pair of two diagonally positioned thrusters, thruster one 411 attached to arm 410 and thruster three 421 attached to arm 420, may be pointed or oriented in parallel to the +Z axis of the servicer satellite 402 and fired simultaneously. This pair of thrusters, thruster one 411 and thruster three 421, will thus produce a combined thrust vector that does not produce a torque around the center of mass 403 of the servicer satellite 402. That is, thruster one 411 produces a thrust one vector 419 and thruster three 421 produces a thrust three vector 429 which combine to yield servicer satellite combined thrust vector 409. The servicer satellite combined thrust vector 409 will move or steer the servicer satellite 402 towards a targeted client or host satellite. The two diagonal thrusters may have a cant and slew angle such that thrust components in the +X, −X, +Y, −Y directions are also achievable allowing maneuverability of the LEXI while keeping the angular momentum under control.

Furthermore, with continued attention to FIGS. 4A-B, the other pair of thrusters, thruster two 431 attached to arm 430 and thruster four 441 attached to arm 440, may be pointed or oriented such that their respective thrust vectors pass through the center of mass 403 of the servicer satellite 402. Such an orientation of each of thruster two 431 and thruster four 441 is achieved by gimbaled movement of the respective arms 430 and 440.

This pair of thrusters, thruster two 431 and thruster four 441, when fired simultaneously, will produce a combined thrust vector that does not produce a torque around the center of mass 403 of the servicer satellite 402. That is, thruster two 431 produces a thrust two vector 439 and thruster four 441 produces a thrust four vector 449 which combine to yield servicer satellite combined thrust vector in the −Z direction (that is, opposite to the thrust vector 409). Such a combined thrust vector operates to slow down, brake, or detach from a targeted client or host satellite.

Figure 5:
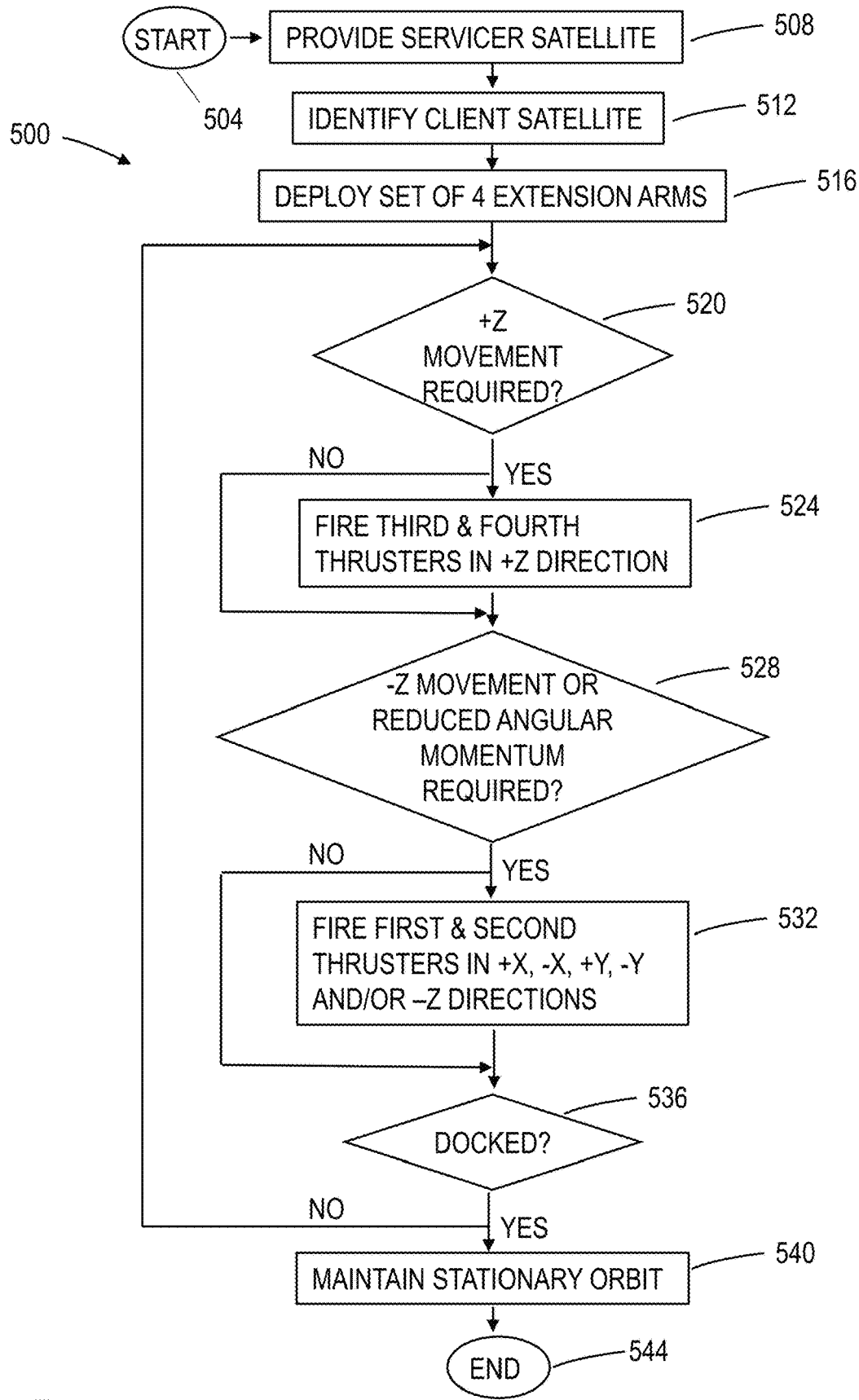
FIG. 5 is a flow chart of one embodiment of a method of use of the electric propulsion servicer satellite system of FIG. 3A.

FIG. 5 is a flow chart of one embodiment of a method of use of the electric propulsion servicer satellite system of FIG. 3A. Note that in some embodiments, some functions (e.g., any of the identified elements numbered 508-540) may be absent, occur in a different order, or include other functions or steps not shown. (For example, step 512 may be absent if the client satellite is identified in advance, such as by a ground controller). A method of use 500 depicted in FIG. 5 will now be described, with reference to aspects and features of the system of FIGS. 1-4 described above.

After starting at step 504, the method 500 proceeds to step 508. At step 508, the electric propulsion servicer satellite system is provided. After completing step 508, the method 500 proceeds to step 512.

At step 512 a client satellite is identified. Various missions involving the client satellite may be present. For example, a mission may involve close approach to the client satellite to observe its condition, may require rendezvous and docking, and/or may involve deorbiting the client. The character of the client satellite may dictate requirements for any docking required, e.g., docking by way of a client interface ring, or by way of client nozzle, or by way of client panels/body, etc. After completing step 512, the method 500 proceeds to step 516.

At step 516, the set of four extension arms of the servicer satellite are deployed. Each of the four extension arms are attached to a thruster, and are configured to orient the respective thruster in six degrees of freedom (i.e., in all three positional locations and all three rotational orientations). After completing step 516, the method 500 proceeds to step 520.

At step 520, a query is made to determine if movement along the +Z axis of the servicer satellite is required. Such movement is required to close the separation distance between the servicer satellite and the client satellite. If the response to the query is YES, the method 500 proceeds to step 524. If the response to the query is NO, the method 500 proceeds to step 528.

At step 524, both of the third (S2) thrusters and the fourth thrusters (N1) are fired, as described in FIG. 3D. The thrusters are fired such that the net thrust vector (i.e., the combined thrust vector 249 and thrust vector 239) result in no rotation of the servicer satellite about the body 302 center of mass. (Note that if outer plane components are required, the generated torques may be absorbed in the reaction wheels of the servicer satellite). After completing step 524, the method 500 proceeds to step 528.

At step 528, a query is made to if determine movement along the −Z axis of the servicer satellite is required and/or movement about the X and/or Y axes is required. Such −Z movement is required to decelerate the rate of closure between the servicer satellite and the client satellite. Such movement about the X and Y axes is required for steering control of the servicer satellite relative to the client satellite. If the response to the query is YES, the method 500 proceeds to step 532. If the response to the query is NO, the method 500 proceeds to step 536.

At step 532, both of the first (S1) and second (N2) thrusters are fired. These two thrusters may be fired in either of two modes or manners. In one manner, as described in FIG. 3E, the two thrusters are fired such that each of thrust vectors 219 and 229 pass through the COM of the body 302, thereby not imparting any torque or rotation to the servicer satellite Each of the thrusters has its own respective Cant and Slew and Thrust magnitude that may be equal or different from one another. Each of the thrust vectors pass through the COM and produce a vector with three components. The three components are in the −Z direction, in the +X or −X direction, and in the +Y or −Y direction. The three components of each of the thrust vectors allow the satellite to be steered such that no torques or rotation are generated, but only forces. For example, by firing the two thrusters simultaneously, a combined (or net) force in each of the three components is generated allowing to change the orbital parameters and guide the servicer satellite. For example, if each of the thrust vectors has its Cant and Slew in the opposite signs to one another and the thrust magnitude is the same, the Y and X components of each of the thrust vectors cancels each other such that the force acting on the satellite in the Y direction is zero and the force acting on the satellite in the X direction is zero where only a combined force in the −Z if produced. In another mode, e.g., in a situation in which the on-board computer calls for off-loading momentum stored in the reaction wheels or momentum wheels, one or both of the thrust vectors 219 and 229 are fired with respective cant and slew angles to produce a net thrust vector that does not pass through the COM of the body 302, but instead is oriented with a selectable cant/slew so as to impart a rotation or momentum to the servicer satellite. This momentum allows the reaction/momentum wheels to be offloaded while at the same time generate forces to steer the servicer satellite. After completing step 532, the method 500 proceeds to step 536.

At step 536, a query is made to determine if the servicer satellite has docked with the client satellite to form an interconnected unit. If the response to the query is YES, the method 500 proceeds to step 540. If the response to the query is NO, the method 500 proceeds to step 520.

At step 540, the stationary orbit of the interconnected unit (of servicer satellite and client satellite) is maintained by way of the set of four thruster arms and associated four thrusters. After completing step 540, the method proves to step 544, and the method ends.

Generally, the RvD phase of operation comprises thrusting along the positive Z axis for steering the LEXI toward the host satellite. An on-board satellite computer using on-board sensors computes the thrust profile (acceleration and deceleration) for the LEXI to execute. The on-board computer commands the thrusters to fire at the proper times while aligning the thruster arms to proper positions and commands the thrust magnitude for each of the thrusters. The two diagonal thrusters (for example N1 and S2) are fired continuously based on a trajectory profile calculated by the LEXI on board computer and guidance and control system. As long as the acceleration is needed, the two diagonal thrusters are operating and close the range between the LEXI and the Host satellite. In case the trajectory calls for deceleration or reaching a complete stop of the acceleration or producing an outer plane corrections in the X or Y directions, the two diagonal thrusters (for example N1 and S2) in the positive Z direction are turned off. Two other diagonal thrusters (for example N2 and S1) are used such that the thruster vector is in the negative Z direction for decelerating the LEXI. These two thrusters also have the capability to steer the LEXI satellite in the other two planes (X, Y) and provide controls for correcting the trajectory and at the same time removing momentum disturbances. This process is continued until the LEXI reaches the proper range and accuracy for docking to the Host satellite.

In one embodiment of operation for the RvD phase, the system controller provides commands to produce thrust (by at least one thruster, to include by a first pair of diagonal thrusters e.g., N1 and S2) in the +Z axis and/or any other plane, and/or to produce thrust (by at least one thruster, to include by a second pair of diagonal thrusters e.g., N2 and S1) in the −Z axis and/or any other plane. More generally, the system controller may command firing of one or more thrusters in any selectable direction or orientation and thrust value, i.e., to produce any selectable thrust vector.

After the LEXI completes its In-Orbit Services, two diagonal thrusters are rotated to a position that generates a force in the negative Z direction, pushing LEXI in a safe manner away from the host (client) satellite to a safe distance and maneuver the LEXI to its parking orbit.

In one embodiment, the one or more extension arms are deployable extension arms.

Note that although the electric propulsion servicer satellite system and method of use has focused on space environments, the system and method may be applied in other environments. For example, the system may be applied in underwater environments.

The exemplary systems and methods of this disclosure have been described in relation to space environments. However, to avoid unnecessarily obscuring the present disclosure, the preceding description omits a number of known structures and devices, and other application and embodiments. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the methods have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A servicer satellite configured to perform rendezvous, docking, and station keeping with a client satellite, the servicer satellite comprising:
a body comprising an X axis with a +X direction and a −X direction, a Y axis with a +Y direction and a −Y direction, and a Z axis with a +Z direction and a −Z direction;
a gripping mechanism attached to the body and configured to attach to the client satellite to form an interconnected docked unit comprising the client satellite and the servicer satellite;
a set of extension arms comprising: i) a first extension arm attached to the body and coupled to a first thruster, ii) a second extension arm attached to the body and coupled to a second thruster, iii) a third extension arm attached to the body and coupled to a third thruster, and iv) a fourth extension arm attached to the body and coupled to a fourth thruster, each of the first extension arm and the third extension arm configured to provide respective 6 DOF positioning of the first thruster and the third-thruster; and
a controller configured with commands to fire: i) the first thruster and the second thruster to produce an acceleration force in the +Z direction and to remove an angular momentum or a rotational velocity of the body, and ii) the third thruster and the fourth thruster to produce a deceleration force in the −Z direction and to remove the angular momentum or the rotational velocity of the body;
wherein:
the acceleration force in the +Z direction closes the separation distance between the servicer satellite and the client satellite;
the deceleration force in the −Z direction decelerates a rate of closure between the servicer satellite and the client satellite;
the servicer satellite performs rendezvous and docking with the client satellite by firing of the first thruster and the second thruster; and
the first thruster and the second thruster fire to maintain the interconnected docked unit at a stationary orbit.

2. The servicer satellite of claim 1, wherein:
the first extension arm further comprises a medial rotatable hinge, is rotatably attached to the body, and is fixedly attached to the first thruster; and
the third extension arm further comprises a medial rotatable hinge, is rotatably attached to the body, and is fixedly attached to the third thruster.

3. The servicer satellite of claim 1, wherein:
each of the first thruster, the second thruster, the third thruster, and the fourth thruster are electric propulsion thrusters.

4. The servicer satellite of claim 1, wherein:
the controller is further configured to calculate and to follow a trajectory that matches orbital parameters of the servicer satellite and orbital parameters of the client satellite while firing the first thruster and the second thruster.

5. The servicer satellite of claim 1, wherein:
the controller is further configured to calculate and to follow a trajectory that matches orbital parameters of the servicer satellite and orbital parameters of the client satellite while firing the third thruster and the fourth thruster.

6. The servicer satellite of claim 1, wherein:
the first extension arm and the second attachment arm are attached to the body at physically separated locations.

7. The servicer satellite of claim 1, wherein:
the third extension arm and the fourth attachment arm are attached to the body at physically separated locations.

8. The servicer satellite of claim 1, wherein:
the first extension arm is fixedly attached to the first thruster and the second extension arm is fixedly attached to the second thruster.

9. The servicer satellite of claim 1, wherein the servicer satellite further comprises a set of momentum wheels operating to perform attitude control of the servicer satellite.

10. The servicer satellite of claim 1, wherein the third extension arm is fixedly attached to the third thruster and the fourth extension arm is fixedly attached to the fourth thruster.

11. A servicer satellite configured to perform rendezvous, docking, and station keeping with a client satellite, the servicer satellite comprising:
a body comprising an X axis with a +X direction and a −X direction, a Y axis with a +Y direction and a −Y direction, and a Z axis with a +Z direction and a −Z direction;
a gripping mechanism attached to the body and configured to attach to the client satellite to form an interconnected docked unit comprising the client satellite and the servicer satellite;
a set of extension arms comprising: i) a first extension arm attached to the body and coupled to a first thruster, ii) a second extension arm attached to the body and coupled to a second thruster, iii) a third extension arm attached to the body and coupled to a third thruster, and iv) a fourth extension arm attached to the body and coupled to a fourth thruster, the first thruster configured to produce an acceleration force and a first thruster thrust vector comprising first thruster thrust vector components along at least one of the +X and −X directions, at least one of the +Y and −Y directions, and at least one of the +Z and −Z directions, and the third thruster configured to produce a deceleration force and a third thruster thrust vector comprising third thruster thrust vector components along at least one of the +X and −X directions, at least one of the +Y and −Y directions, and at least one of the +Z and −Z directions; and
a controller configured to: i) fire the first thruster and the second thruster to produce thrust in the +Z direction and to simultaneously remove an angular momentum of the body caused by angular momentum disturbances; and ii) fire the third thruster and the fourth thruster to produce thrust in the −Z direction and to simultaneously remove the angular momentum of the body caused by angular momentum disturbances;
wherein:
the thrust in the +Z direction closes the separation distance between the servicer satellite and the client satellite;
the thrust in the −Z direction decelerates a rate of closure between the servicer satellite and the client satellite;
the servicer satellite performs rendezvous and docking with the client satellite by firing of at least the first thruster and the second thruster; and at least the first thruster and the second thruster fire to maintain the interconnected docked unit at a stationary orbit.

12. The servicer satellite of claim 11, wherein the controller is further configured to calculate and to follow a trajectory that matches orbital parameters of the servicer satellite and orbital parameters of the client satellite while firing the first thruster and the second thruster.

13. The servicer satellite of claim 11, wherein:
each of the first extension arm and the second extension arm are configured to provide respective 6 DOF positioning of the first thruster and the second thruster; and
each of the third extension arm and the fourth extension arm are configured to provide respective 6 DOF positioning of the third thruster and the fourth thruster.

14. The servicer satellite of claim 11, wherein the controller is further configured to calculate and to follow a trajectory that matches orbital parameters of the servicer satellite and orbital parameters of the client satellite while firing the third thruster and the fourth thruster.

15. A servicer satellite configured to perform rendezvous, docking, and station keeping with a client satellite, the servicer satellite comprising:
a body comprising an X axis with a +X direction and a −X direction, a Y axis with a +Y direction and a −Y direction, and a Z axis with a +Z direction and a −Z direction;
a gripping mechanism attached to the body and configured to attach to the client satellite to form an interconnected docked unit comprising the client satellite and the servicer satellite;
a set of extension arms comprising: i) a first extension arm attached to the body and coupled to a first thruster at a first extension arm second location, ii) a second extension arm attached to the body and coupled to a second thruster, iii) a third extension arm attached to the body and coupled to a third thruster, and iv) a fourth extension arm attached to the body and coupled to a fourth thruster, each of the first extension arm, the second extension arm, the third extension arm, and the fourth extension arm configured to provide respective 6 DOF positioning of the first thruster, the second thruster, the third thruster, and the fourth thruster, the first thruster and the second thruster configured to produce an acceleration force and the third thruster and the fourth thruster configured to produce a deceleration force; and
a controller configured with commands: i) to fire the first thruster and the second thruster to produce thrust in the +Z direction, to accelerate the servicer satellite, and to reduce an angular momentum or a rotational velocity of the body; and ii) to fire the third thruster and the fourth thruster to produce thrust in the −Z direction, to decelerate the servicer satellite, and to reduce the angular momentum or the rotational velocity of the body;
wherein:
the servicer satellite performs rendezvous and docking with the client satellite by firing of the first thruster and the second thruster; and
the first thruster and the second thruster maintain the interconnected docked unit at a stationary orbit.

16. The servicer satellite of claim 15, wherein:
each of the first thruster, the second thruster, the third thruster, and the fourth thruster are electric propulsion thrusters.

17. The servicer satellite of claim 15, wherein the servicer satellite further comprises a set of momentum wheels operating to perform attitude control of the servicer satellite.

18. The servicer satellite of claim 15, wherein the controller is further configured to calculate and to follow a trajectory that matches orbital parameters of the servicer satellite and orbital parameters of the client satellite while firing the first thruster and the second thruster.

19. A servicer satellite configured to perform rendezvous, docking, and station keeping with a client satellite, the servicer satellite comprising:
a body comprising an X axis with a +X direction and a −X direction, a Y axis with a +Y direction and a −Y direction, and a Z axis with a +Z direction and a −Z direction;
a gripping mechanism attached to the body and configured to attach to the client satellite to form an interconnected docked unit comprising the client satellite and the servicer satellite;
a set of extension arms comprising: i) a first extension arm attached to the body and coupled to a first thruster and a second extension arm attached to the body and coupled to a second thruster, each of the first thruster and the second thruster configured to produce an acceleration force; and ii) a third extension arm attached to the body and coupled to a third thruster and a fourth extension arm attached to the body and coupled to a fourth thruster, each of the third thruster and the fourth thruster configured to produce a deceleration force; and
a controller configured with commands to: i) fire the first thruster and the second thruster to produce thrust in the +Z direction and reduce an angular momentum or a rotational velocity of the body; and ii) fire each of the third thruster and the fourth thruster to produce thrust in the −Z direction and reduce the angular momentum or the rotational velocity of the body;
wherein:
the thrust in the +Z direction closes the separation distance between the servicer satellite and the client satellite;
the thrust in the −Z direction decelerates a rate of closure between the servicer satellite and the client satellite; and
the servicer satellite performs rendezvous and docking with the client satellite by firing of at least one of the first thruster and the second thruster and by firing of at least one of the third thruster and the fourth thruster.

20. The servicer satellite of claim 19, wherein the interconnected docked unit is maintained at a stationary orbit by operation of at least one of the first thruster and the second thruster and by operation of at least one of the third thruster and the fourth thruster.

21. The servicer satellite of claim 19, wherein each of the first thruster, the second thruster, the third thruster, and the fourth thruster are electric propulsion thrusters.

22. The servicer satellite of claim 19, wherein the servicer satellite further comprises a set of momentum wheels operating to perform attitude control of the servicer satellite.

23. The servicer satellite of claim 19, wherein the controller is further configured to calculate and to follow a trajectory that matches orbital parameters of the servicer satellite and orbital parameters of the client satellite while firing the first thruster and the second thruster.

* * * * *